US012770608B2

(12) United States Patent
Min et al.

(10) Patent No.: US 12,770,608 B2
(45) Date of Patent: Oct. 20, 2026

(54) SYSTEMS AND METHODS FOR TEXT-TO-SPEECH SYNTHESIS

(71) Applicant: Datum Point Labs Inc., Jackson, WY (US)

(72) Inventors: Jeongki Min, Seoul (KR); Bonhwa Ku, Seoul (KR); Hanseok Ko, Seoul (KR)

(*) Notice: Subject to any disclaimer, the term of this patent is extended or adjusted under 35 U.S.C. 154(b) by 216 days.

(21) Appl. No.: 18/598,996

(22) Filed: Mar. 7, 2024

(65) Prior Publication Data

US 2024/0339104 A1 Oct. 10, 2024

Related U.S. Application Data

(60) Provisional application No. 63/457,630, filed on Apr. 6, 2023.

(51) Int. Cl.
*G10L 13/047* (2013.01)
*G10L 15/16* (2006.01)

(52) U.S. Cl.
CPC ............ *G10L 13/047* (2013.01); *G10L 15/16* (2013.01)

(58) Field of Classification Search
CPC ...... G10L 13/047; G10L 15/16; G10L 13/033
See application file for complete search history.

(56) References Cited

U.S. PATENT DOCUMENTS

| | | | | |
|---|---|---|---|---|
| 4,015,087 A * | 3/1977 | Stewart | G10L 15/00 704/205 |
| 7,103,548 B2 * | 9/2006 | Squibbs | H04M 1/72427 704/260 |
| 11,978,431 B1 * | 5/2024 | Joly | G10L 13/0335 |
| 12,296,265 B1 * | 5/2025 | Gupta | G10L 19/04 |
| 2010/0145705 A1 * | 6/2010 | Kirkeby | H04M 1/7243 704/260 |
| 2020/0082807 A1 * | 3/2020 | Kim | G06N 3/045 |
| 2021/0090551 A1 * | 3/2021 | Jang | G10L 13/08 |
| 2021/0151029 A1 * | 5/2021 | Gururani | G06N 3/0455 |

(Continued)

OTHER PUBLICATIONS

Saiteja, K., 2023. Towards building controllable Text to Speech systems (Doctoral dissertation, International Institute of Information Technology Hyderabad). (Year: 2023).*

(Continued)

*Primary Examiner* — Fariba Sirjani
(74) *Attorney, Agent, or Firm* — The Rapacke Law Group, P.A.; Andrew S. Rapacke; Kenneth F. Brooks

(57) ABSTRACT

Embodiments described herein provide systems and methods for text to speech synthesis. A system receives, via a data interface, an input text, a reference spectrogram, and at least one of an emotion ID or speaker ID. The system generates, via a first encoder, a vector representation of the input text. The system generates, via a second encoder, a vector representation of the reference spectrogram. The system generates, via a variance adaptor, a modified vector representation based on a combined representation including a combination of the vector representation of the input text, the vector representation of the reference spectrogram, and at least one of an embedding of the emotion ID or an embedding of the speaker ID. The system generates, via a decoder, an audio waveform based on the modified vector representation. The generated audio waveform may be played via a speaker.

20 Claims, 9 Drawing Sheets

(56) References Cited

U.S. PATENT DOCUMENTS

| | | | | |
|---|---|---|---|---|
| 2022/0382999 | A1* | 12/2022 | Gunasekara | G10L 15/142 |
| 2023/0099732 | A1* | 3/2023 | Mukherjee | G06N 3/0442<br>704/258 |
| 2024/0105160 | A1* | 3/2024 | Kim | G10L 13/047 |
| 2024/0127788 | A1* | 4/2024 | Hsieh | G10L 13/00 |
| 2024/0339103 | A1* | 10/2024 | Min | G10L 13/033 |
| 2024/0339104 | A1* | 10/2024 | Min | G10L 13/033 |
| 2025/0349282 | A1* | 11/2025 | Li | G10L 15/02 |

OTHER PUBLICATIONS

Kumar, N., Narang, A. and Lall, B., 2022. Zero-shot normalization driven multi-speaker text to speech synthesis. IEEE/ACM Transactions on Audio, Speech, and Language Processing, 30, pp. 1679-1693. (Year: 2022).*

Wang, Yuxuan, et al. Tacotron: Towards end-to-end speech synthesis. Interspeech, 2017, 5 pages.

Ren, Yi, et al. Fastspeech: Fast, robust and controllable text to speech. Advances in neural information processing, 2019, 10 pages.

Ren, Yi, et al. Fastspeech2: Fast and high-quality end-to-end text to speech. ICLR, 2021, 15 pages.

Gulati, Anmol, et al. Conformer: Convolution-augmented transformer for speech recognition. Interspeech, 2020, 5 pages.

Chang, Jen-Hao Rick, et al. Style equalization: Unsupervised learning of controllable generative sequence models. In: International Conference on Machine Learning. PMLR, 2002, 22 pages.

Chen, Mingjian, et al. Adaspeech: Adaptive text to speech for custom voice, ICLR, 2021, 10 pages.

* cited by examiner

| Emotion | Fast Speech 2 | Framework 100 |
|---|---|---|
| Angry | 3.5 | 4.4 |
| Excited | 3.7 | 4.2 |
| Happy | 3.5 | 4.4 |
| Sad | 4 | 4.8 |
| Surprised | 3.8 | 4.1 |

FIG. 9

SYSTEMS AND METHODS FOR TEXT-TO-SPEECH SYNTHESIS

CROSS REFERENCE(S)

The instant application is a nonprovisional of and claim priority under 35 U.S.C. 119 to U.S. provisional application No. 63/457,630, filed Apr. 6, 2023, which is hereby expressly incorporated by reference herein in its entirety.

TECHNICAL FIELD

The embodiments relate generally to systems and methods for text-to-speech (TTS) synthesis.

BACKGROUND

Conventional speech synthesis methods generate synthesized speech through rule-based methods, various databases, and statistical methods. Existing deep learning-based speech synthesis methods requires a 'text-voice' pair of data as high-quality training data in order to generate speech of a specific voice based on an input text. Existing models based on deep learning have the disadvantage of not being able to perform parallel processing to generate synthesized speech and take very long training and inference times. In addition, there is a problem with unnatural speech and the inability to express various emotions. Therefore, there is a need for improved systems and methods for text-to-speech synthesis.

BRIEF DESCRIPTION OF THE DRAWINGS

FIG. 9 is a chart illustrating exemplary performance of a text to speech model, according to some embodiments.

DETAILED DESCRIPTION

Conventional speech synthesis methods generate synthesized speech through rule-based methods, various databases, and statistical methods. Existing deep learning-based speech synthesis methods requires a 'text-voice' pair of data as high-quality training data in order to generate speech of a specific voice based on an input text. Existing models based on deep learning have the disadvantage of not being able to perform parallel processing to generate synthesized speech and take very long training and inference times. In addition, there is a problem with unnatural speech and the inability to express various emotions. Embodiments described herein provide methods capable of short inference time, natural speech, and various speakers and emotional expressions used as integrated models to solve the problems.

Embodiments described herein provide a text to speech synthesis model that allows for speaker and emotion control in real time. Encoded text is combined with vectors representing an encoded style based on an input reference spectrogram, emotion based on an input emotion ID, and speaker based on an input speaker ID. The combined vectors are input to a variance adaptor that further adapts the vector representation with appropriate pitch, energy, and duration. The encoded speech is then decoded via a decoder (e.g., a text to speech decoder followed by a vocoder) to generate an output waveform. The inclusion of additional information (reference spectrogram, emotion ID, speaker ID) allows for a more natural synthesis with control over the voice and emotion in real-time.

Embodiments described herein provide a number of benefits. For example, embodiments described herein provide a framework for real-time text to speech synthesis that allows for control of speaker and emotion. The use of convolutional neural network (CNN) based variants of transformer networks (e.g., conformer) for the encoder and decoder improves the naturalness of synthesized speech. The use of a vocoder that uses a parallel wave GAN solves differences in pronunciation by fine-tuning each dataset.

Figure 1:
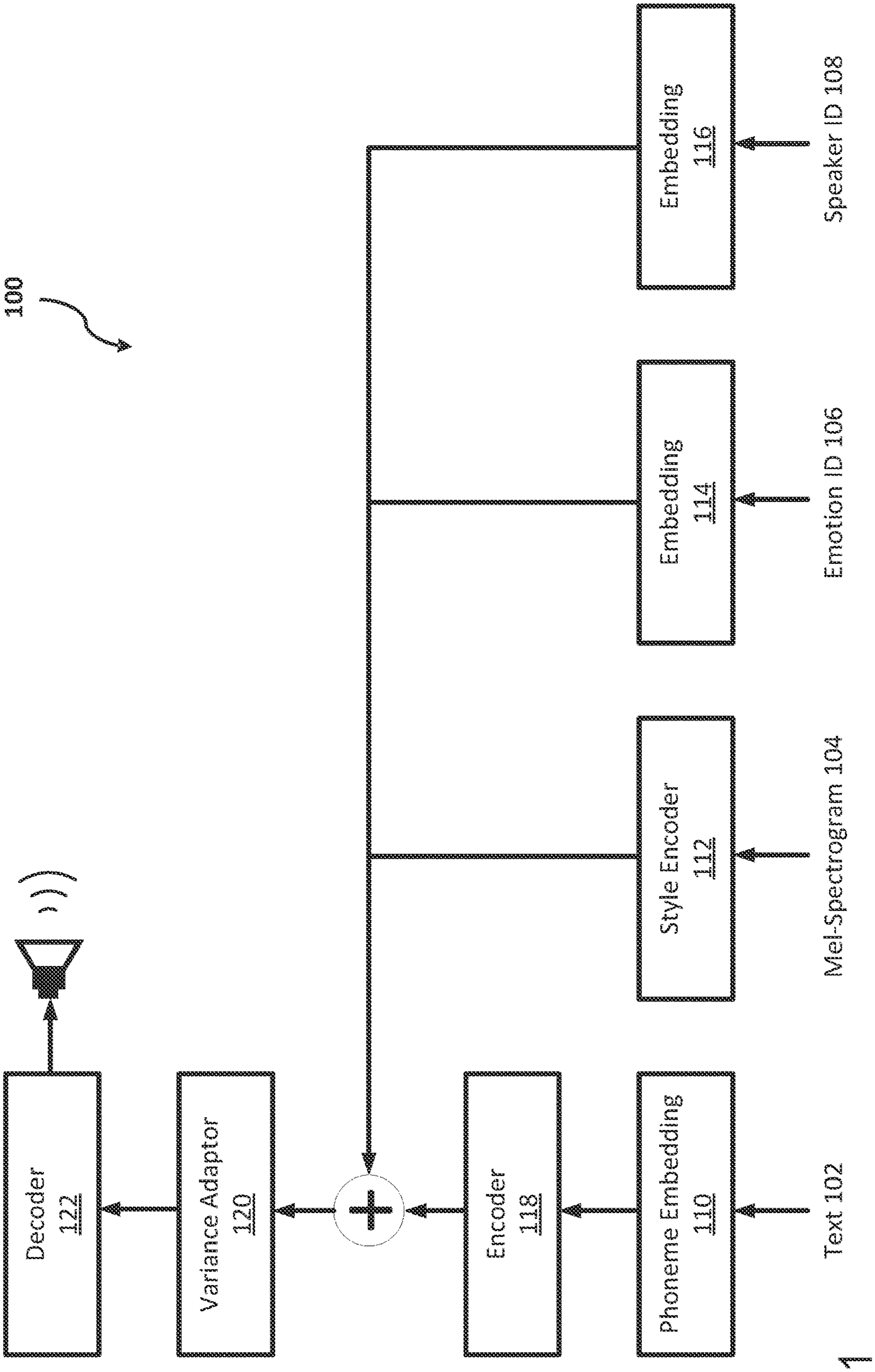
FIG. 1 illustrates a framework for text to speech synthesis, according to some embodiments.

FIG. 1 illustrates an exemplary framework 100 for text to speech synthesis, according to some embodiments. Framework 100 includes phoneme embedding 110 that receives an input text 102 and generates embeddings for each phoneme represented in text 102. Phoneme embedding 110 may use a pre-trained embedding model or lookup table to generate vectors representing phonemes. Embedded phonemes may be input to encoder 118. Encoder 118 may include positional encoding that is applied to the embedded phonemes. For example, a combination of sine-wave functions may be applied to the phonemes so that each phoneme has a distinct encoding that represents the position of the phoneme in the text. Encoder 118 may convert the phoneme embedding sequence into a latent phoneme sequence representation. In some embodiments, encoder 118 generates an output vector (token) for each input phoneme, such that a sequence of phonemes (based on an input text 102, may results in a vector/token sequence output by encoder 118. The latent phoneme sequence representation may be, for example, a sequence of 384 dimensional vectors. Encoder 118 may be based on a feed-forward transformer structure that includes an attention mechanism between phonemes in the input sequence, for example as described in Ren et al., Fastspeech: Fast, robust and controllable text to speech, Advances in Neural Information Processing Systems, pp. 3165-3174, 2019.

To further capture global and local dependencies, encoder 118 may further include convolutional neural network (CNN) layers into the feed-forward transformer structure. Including CNN layers to transformer structures takes into account the fact that CNN layers are more effective in generating local information beyond just sequential information. When using a structure changed from a transformer to a CNN-based transformer, the encoder 118 can generate not only sequential information of the text 102 but also information between neighboring phonemes within the text 102. Similarly, decoder 122 may use a CNN-based transformer model to generate not only sequential information of the Mel-spectrogram, but also information from nearby Mel-spectrogram frames.

The latent phoneme sequence representation may be modified by summing the vectors with additional features as illustrated. A reference voice may be input in the form of a spectrogram (e.g., a Mel-spectrogram 104). The Mel-spectrogram 104 may be input to a style encoder 112 to generate a latent representation of the style of the voice in the Mel-spectrogram 104. Mel-spectrogram 104 may represent, for example, a short audio clip of a speaker speaking a sample text in a specified emotion. The structure of style encoder 112 is described in FIG. 3. An emotion ID 106 may also be input to embedding block 114 to provide an embedded emotion representation vector. The emotion ID may indicate the emotion associated with Mel-spectrogram 104. For example, if Mel-spectrogram 104 represents speech of a person using an angry voice, emotion ID 106 may indicate (e.g., via a predefined one-hot encoding) the "angry" emotion. At inference, a reference Mel-spectrogram 104, emotion ID 106, and/or speaker ID 108 may be used to direct framework 100 in generating speech from text 102 with the voice of the speaker identified by speaker ID 108, in the emotion identified by emotion ID 106, and as exemplified by Mel-spectrogram 104.

Similarly, speaker ID 108 may be embedded via embedding block 116 to an embedded speaker ID representation vector. For example, the speaker associated with Mel-spectrogram 104 may be indicated by speaker ID 108 (e.g., via a predefined one-hot encoding). In an example, a fixed number of emotions are supported (e.g., 5 emotions: angry, excited, happy, sad, and surprised) and a fixed number of speakers are supported (e.g., 10 distinct speakers). This may mean that speaker and emotion IDs are indicated via predefined encodings (e.g., one-hot encodings) associated with respective emotions and speakers. During the training process, speakers and their emotions for respective training audio (input as reference Mel-Spectrogram 104) may be indicated via speaker ID 108 and emotion ID 106. In some embodiments, training may be performed as described below with the speaker ID 108 and emotion ID 106 corresponding to the Mel-spectrogram 104, and at inference they may also correspond. In other embodiments, at inference, the speaker ID 108 and/or emotion ID 106 may differ from the Mel-spectrogram 104 in order to modify the output emotion or speaker accordingly.

Variance adaptor 120 may be provided an input vector representation that is a combination of the output vector of encoder 118, style encoder 112, embedding 114, and embedding 116. For example, the combination may be a sum, weighted sum, normalized sum, average, etc. of those vectors. Variance adaptor 120 may adapt the input combination vector representation to adjust pitch, energy, and duration. Details of variance adaptor 120 are described in FIG. 2. The output of variance adaptor 120 may be a latent vector representation of an audio utterance. In some embodiments, the latent vector representation output of variance adaptor 120 may be one or more Mel-spectrograms associated with each phoneme.

Decoder 122 may convert the latent vector representation from variance adaptor 120 into a playable audio waveform. In some embodiments, decoder 122 includes a Mel-spectrogram decoder that produces a Mel-spectrogram, and a vocoder that converts the Mel-spectrogram into a waveform. In some embodiments, decoder 122 directly generates a waveform from the latent vector representation from variance adaptor 120 without first generating a Mel-spectrogram. In some embodiments, positional encoding is applied to the latent vector representation so that positional information may be utilized by decoder 122 in generating the waveform. For example, a combination of sine-wave functions may be applied to the vectors so that each vector has a distinct encoding that represents the position of the vector relative to others.

Figure 2:
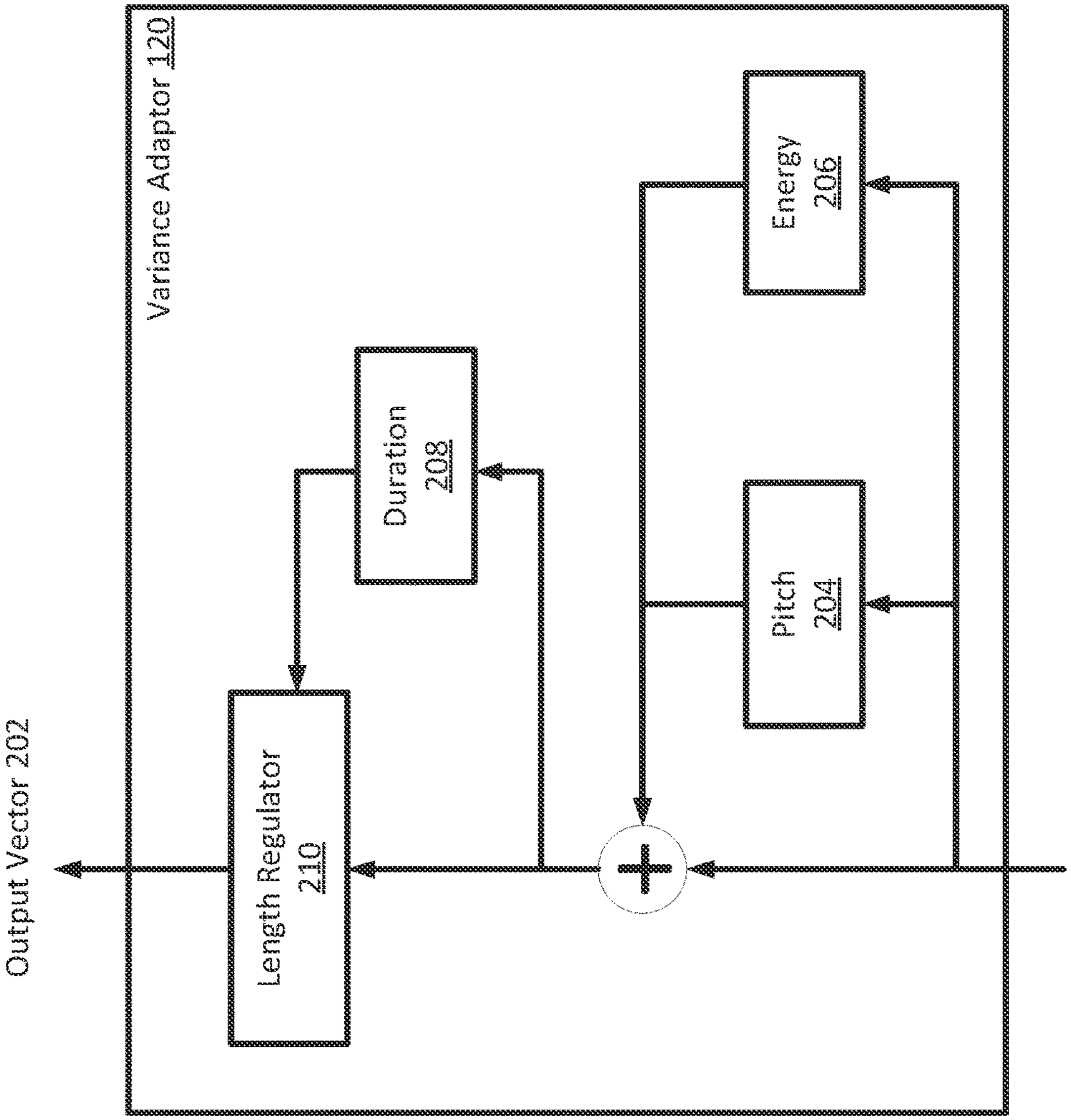
FIG. 2 illustrates a simplified diagram of an exemplary variance adaptor, according to some embodiments.

FIG. 2 illustrates a simplified diagram of an exemplary variance adaptor 120, according to some embodiments. As described in FIG. 1, variance adaptor 120 receives an input vector 202, and adapts the input vector 202 to generate output vector 212 (or Mel-spectrogram) with pitch, energy, and duration. The duration may be the result of repeating Mel-spectrograms to increase the duration of the related phoneme. In some embodiments, input vector 202 is input to a pitch predictor 204 and an energy predictor 206. Pitch predictor 204 and energy predictor 206 may be neural network based models that generate a vector output of the same dimensionality as input vector 202, so that those vectors may be summed together with input vector 202. The summing may be a direct sum, weighted sum, normalized sum, average, etc. Parameters of pitch predictor 204 and energy predictor 206 may be trainable parameters.

After summing the input vector 202 with a pitch vector and energy vector, a duration predictor 208 may predict the duration of each phoneme as represented by the summed vector. Length regulator 210 may expand or contract the source phoneme vectors to match the length predicted by duration predictor 208. The duration of a phoneme may be changed by length regulator 210, for example, by up-sampling the phoneme sequence by increasing the number of output vectors 212 and thereby increasing the number of output vectors 212 associated with each phoneme. In some embodiments, the output vector 212 of length regulator 210 is a Mel-spectrogram, and to adjust for duration the Mel-spectrogram frames (Mel-frames) are duplicated. In some embodiments, the input vector 202 is a vector format that is not a Mel-spectrogram, and length regulator 210 converts the output to Mel-spectrogram format as part of length regulation.

Output vectors 212 may be duplicated based on the desired length as predicted by duration predictor 208. A benefit of summing pitch, energy, style, emotion ID, and/or speaker ID representations before length regulation is it has a simpler timestep, as it is related to phonemes rather than the varied output timestep after length regulation. This may result in accurate outputs using fewer resources and/or faster convergence of the models during training. For example, it may be more efficient to sum feature before length regulation in terms of computational complexity to perform calculations in a text sequence as compared to performing calculations after expanding the time sequence with Mel-spectrogram outputs. Since the length of information expressed in voice is generally longer than information expressed in text, it is more computationally efficient to perform computations on the text side of length regulation.

Figure 3:
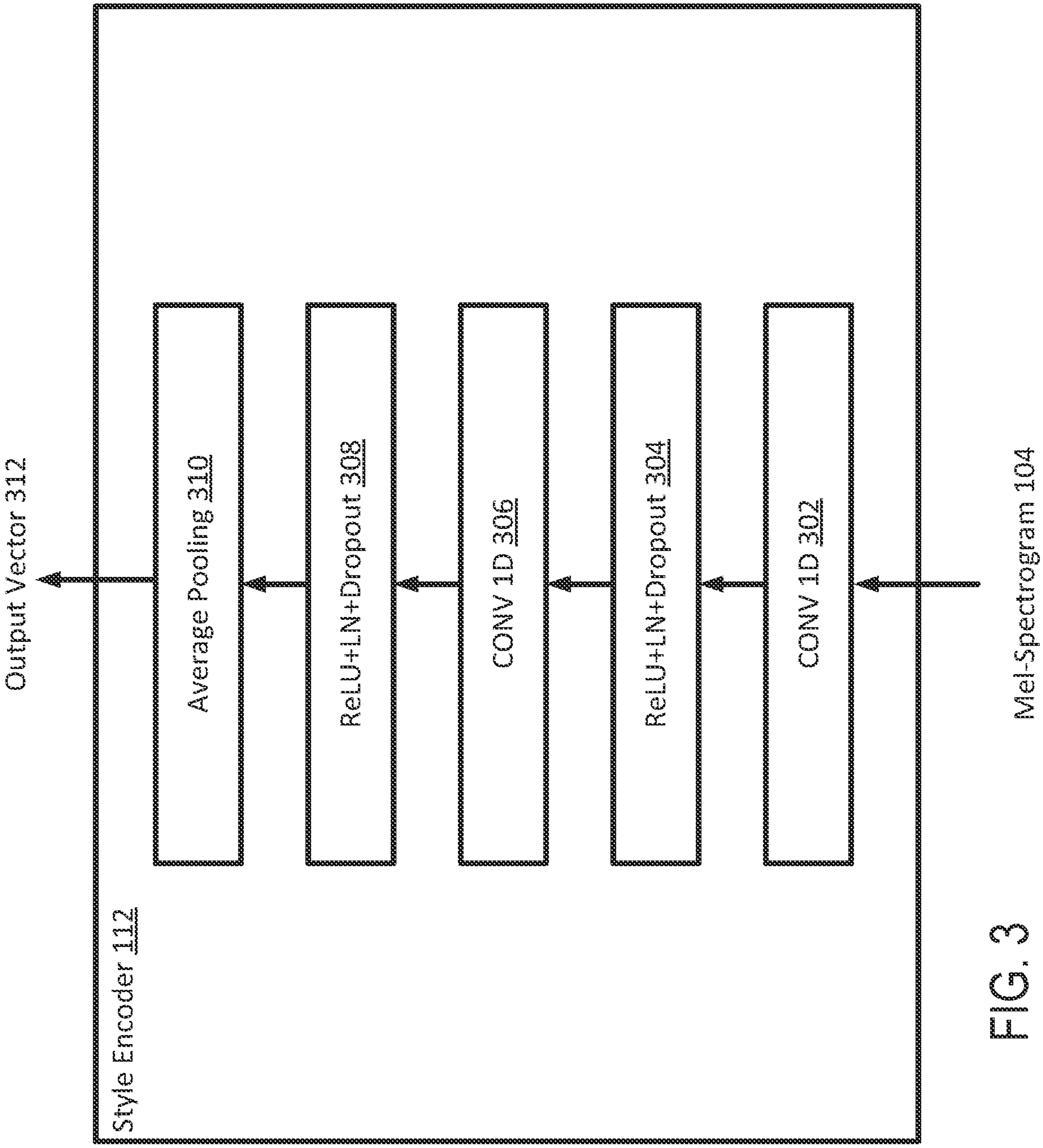
FIG. 3 illustrates a simplified diagram of an exemplary style encoder, according to some embodiments.

FIG. 3 illustrates a simplified diagram of an exemplary style encoder 112, according to some embodiments. As described in FIG. 1, style encoder 112 receives a Mel-spectrogram 104 as an input, and outputs an output vector 312 representing the style of Mel-spectrogram 104. As illustrated, style encoder 112 may include multiple processing layers including 1D convolutional layers, and activation/pooling layers. In the illustrated example, style encoder 121 includes 1D convolutional layer 302, ReLU/linear normalization/dropout layer 304, 1D convolution layer 306, ReLU/linear normalization/dropout layer 308, and an average pooling layer 310. These layers may include trainable parameters that are trained according to one or more loss functions as described herein.

Returning to the description of FIG. 1, parameters of framework 100 may be trained via backpropagation according to one or more loss functions. Training data may include ground truth pairs of text and output audio, with corresponding emotion ID 106 and speaker ID 108 labels. In some embodiments, Mel-spectrogram 104 is generated based on the ground-truth output audio. Training data may include a number of speakers speaking text using a number of different emotions. In some embodiments, the loss function is based on a comparison between the input training audio and the generated audio. In some embodiments, the loss function is based on a comparison of Mel-spectrograms, with one Mel-spectrogram generated based on the ground-truth audio, and another Mel-spectrogram generated based on the output of variance adaptor 120 (e.g., by decoder 122). The loss function may be, for example, a mean square error (MSE) loss. Parameters of phoneme embedding 110, style encoder 112, embedding 114, embedding 116, encoder 118, variance adaptor 120, and/or decoder 122 may be updated. Note that the use of a reference Mel-spectrogram 104, emotion ID 106, and/or speaker ID 108 improves the training performance over using input text 102 alone, as training solely with ground truth text 102 and output audio or Mel-spectrograms may result in loss of style information.

Figure 4:
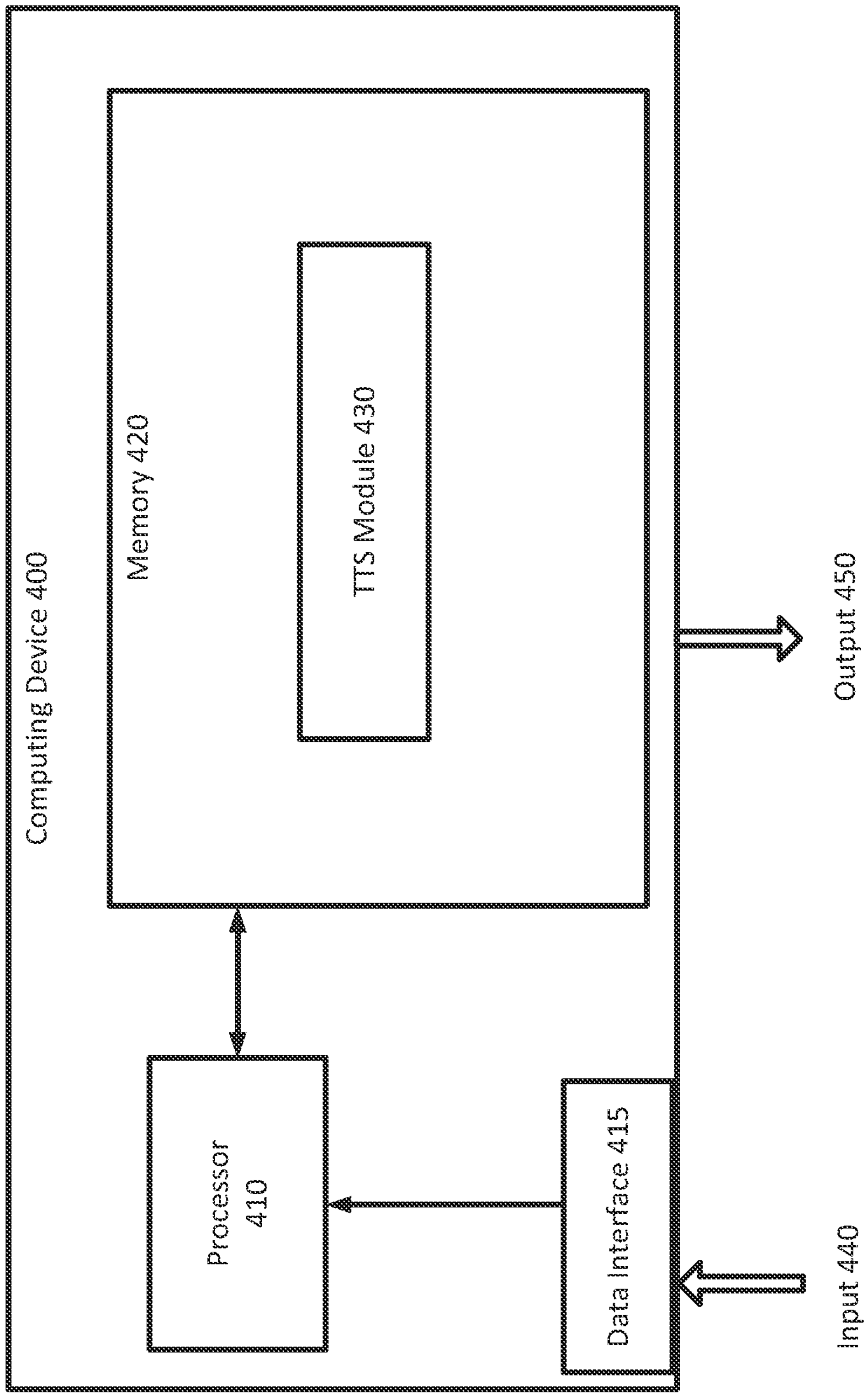
FIG. 4 is a simplified diagram illustrating a computing device implementing the framework described herein, according to some embodiments.

FIG. 4 is a simplified diagram illustrating a computing device 400 implementing the framework described herein, according to some embodiments. As shown in FIG. 4, computing device 400 includes a processor 410 coupled to memory 420. Operation of computing device 400 is controlled by processor 410. And although computing device 400 is shown with only one processor 410, it is understood that processor 410 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 400. Computing device 400 may be implemented as a stand-alone subsystem, as a board added to a computing device, and/or as a virtual machine.

Memory 420 may be used to store software executed by computing device 400 and/or one or more data structures used during operation of computing device 400. Memory 420 may include one or more types of transitory or non-transitory machine-readable media (e.g., computer-readable media). Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 410 and/or memory 420 may be arranged in any suitable physical arrangement. In some embodiments, processor 410 and/or memory 420 may be implemented on a same board, in a same package (e.g., system-in-package), on a same chip (e.g., system-on-chip), and/or the like. In some embodiments, processor 410 and/or memory 420 may include distributed, virtualized, and/or containerized computing resources. Consistent with such embodiments, processor 410 and/or memory 420 may be located in one or more data centers and/or cloud computing facilities.

In some examples, memory 420 may include non-transitory, tangible, machine readable media that includes executable code that when run by one or more processors (e.g., processor 410) may cause the one or more processors to perform the methods described in further detail herein. For example, as shown, memory 420 includes instructions for text-to-speech (TTS) module 430 that may be used to implement and/or emulate the systems and models, and/or to implement any of the methods described further herein.

TTS module 430 may receive input 440 such as text input, reference audio or Mel-spectrogram, speaker ID, and/or emotion ID and generate an output 450 such as a generated Mel-spectrogram or audio waveform. For example, TTS module 430 may be configured to perform text to speech synthesis based on a specified emotion and speaker.

The data interface 415 may comprise a communication interface, a user interface (such as a voice input interface, a graphical user interface, and/or the like). For example, the computing device 400 may receive the input 440 from a networked device via a communication interface. Or the computing device 400 may receive the input 440, such as speaker ID, etc., from a user via the user interface.

Some examples of computing devices, such as computing device 400 may include non-transitory, tangible, machine readable media that include executable code that when run by one or more processors (e.g., processor 410) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 5:
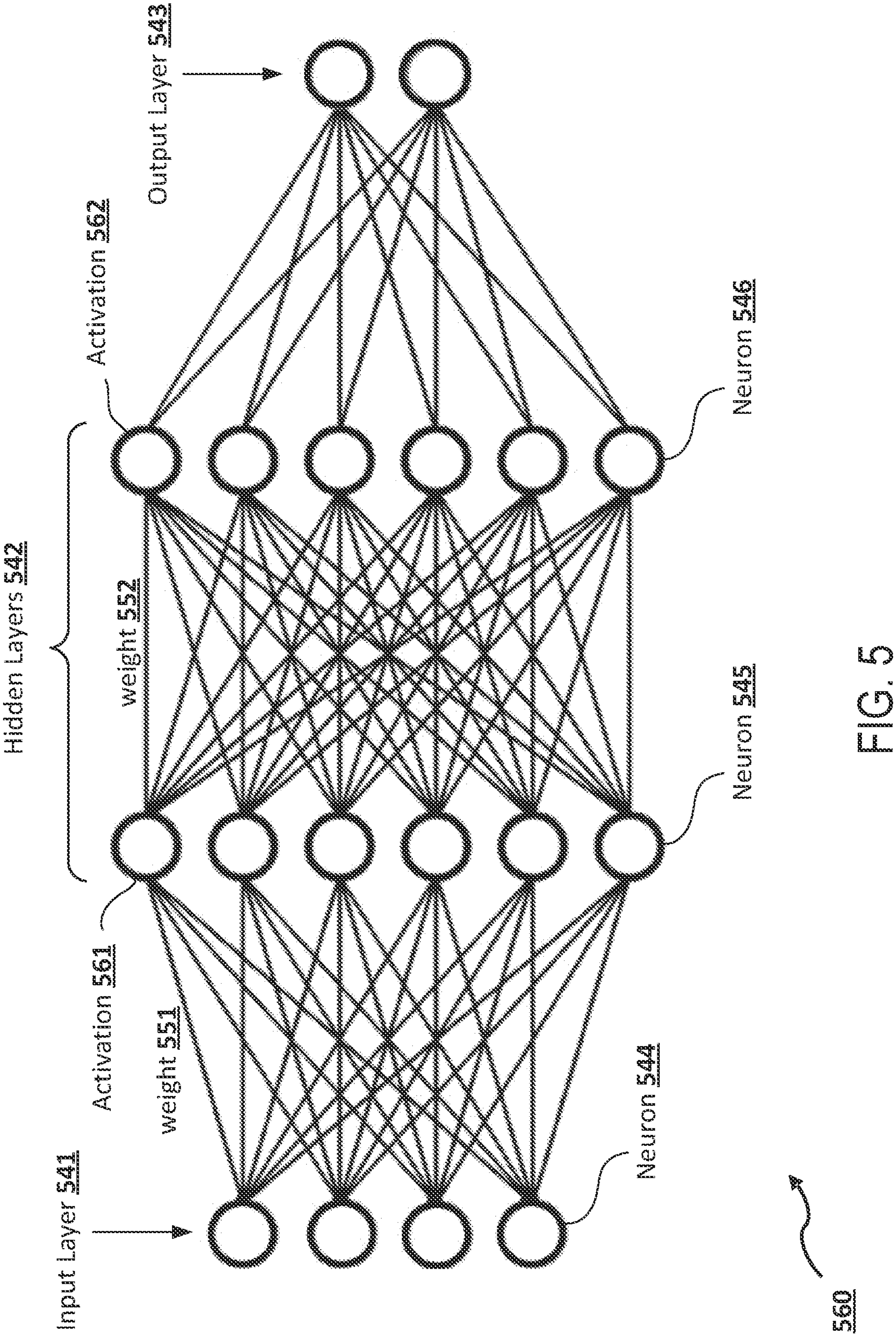
FIG. 5 is a simplified diagram illustrating a neural network structure, according to some embodiments.

FIG. 5 is a simplified diagram illustrating the neural network structure, according to some embodiments. In some embodiments, the TTS module 430 may be implemented at least partially via an artificial neural network structure shown in FIG. 5. The neural network comprises a computing system that is built on a collection of connected units or nodes, referred to as neurons (e.g., 544, 545, 546). Neurons are often connected by edges, and an adjustable weight (e.g., 551, 552) is often associated with the edge. The neurons are often aggregated into layers such that different layers may perform different transformations on the respective input and output transformed input data onto the next layer.

For example, the neural network architecture may comprise an input layer 541, one or more hidden layers 542 and an output layer 543. Each layer may comprise a plurality of neurons, and neurons between layers are interconnected according to a specific topology of the neural network topology. The input layer 541 receives the input data such as training data, user input data, vectors representing latent features, etc. The number of nodes (neurons) in the input layer 541 may be determined by the dimensionality of the input data (e.g., the length of a vector of the input). Each node in the input layer represents a feature or attribute of the input.

The hidden layers 542 are intermediate layers between the input and output layers of a neural network. It is noted that two hidden layers 542 are shown in FIG. 5 for illustrative purpose only, and any number of hidden layers may be utilized in a neural network structure. Hidden layers 542 may extract and transform the input data through a series of weighted computations and activation functions.

For example, as discussed in FIG. 4, the TTS module 430 receives an input 440 and transforms the input into an output 450. To perform the transformation, a neural network such as the one illustrated in FIG. 5 may be utilized to perform, at least in part, the transformation. Each neuron receives input signals, performs a weighted sum of the inputs according to weights assigned to each connection (e.g., 551, 552), and then applies an activation function (e.g., 561, 562, etc.) associated with the respective neuron to the result. The output of the activation function is passed to the next layer of neurons or serves as the final output of the network. The activation function may be the same or different across different layers. Example activation functions include but not limited to Sigmoid, hyperbolic tangent, Rectified Linear Unit (ReLU), Leaky ReLU, Softmax, and/or the like. In this way, after a number of hidden layers, input data received at the input layer 541 is transformed into rather different values indicative data characteristics corresponding to a task that the neural network structure has been designed to perform.

The output layer 543 is the final layer of the neural network structure. It produces the network's output or prediction based on the computations performed in the preceding layers (e.g., 541, 542). The number of nodes in the output layer depends on the nature of the task being addressed. For example, in a binary classification problem, the output layer may consist of a single node representing the probability of belonging to one class. In a multi-class classification problem, the output layer may have multiple nodes, each representing the probability of belonging to a specific class.

Therefore, the TTS module 430 may comprise the transformative neural network structure of layers of neurons, and weights and activation functions describing the non-linear transformation at each neuron. Such a neural network structure is often implemented on one or more hardware processors 410, such as a graphics processing unit (GPU).

In one embodiment, the TTS module 430 may be implemented by hardware, software and/or a combination thereof. For example, the TTS module 430 may comprise a specific neural network structure implemented and run on various hardware platforms 560, such as but not limited to CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware 560 used to implement the neural network structure is specifically configured based on factors such as the complexity of the neural network, the scale of the tasks (e.g., training time, input data scale, size of training dataset, etc.), and the desired performance.

In one embodiment, the neural network based TTS module 430 may be trained by iteratively updating the underlying parameters (e.g., weights 551, 552, etc., bias parameters and/or coefficients in the activation functions 561, 562 associated with neurons) of the neural network based on a loss function. For example, during forward propagation, the training data such as text with associated audio recordings labeled with speaker ID and emotion ID are fed into the neural network. The data flows through the network's layers 541, 542, with each layer performing computations based on its weights, biases, and activation functions until the output layer 543 produces the network's output 550. In some embodiments, output layer 543 produces an intermediate output on which the network's output 550 is based.

The output generated by the output layer 543 is compared to the expected output (e.g., a "ground-truth" such as the corresponding ground truth audio waveform or Mel-spectrogram) from the training data, to compute a loss function that measures the discrepancy between the predicted output and the expected output. Given a loss function, the negative gradient of the loss function is computed with respect to each weight of each layer individually. Such negative gradient is computed one layer at a time, iteratively backward from the last layer 543 to the input layer 541 of the neural network. These gradients quantify the sensitivity of the network's output to changes in the parameters. The chain rule of calculus is applied to efficiently calculate these gradients by propagating the gradients backward from the output layer 543 to the input layer 541.

Parameters of the neural network are updated backwardly from the last layer to the input layer (backpropagating) based on the computed negative gradient using an optimization algorithm to minimize the loss. The backpropagation from the last layer 543 to the input layer 541 may be conducted for a number of training samples in a number of iterative training epochs. In this way, parameters of the neural network may be gradually updated in a direction to result in a lesser or minimized loss, indicating the neural network has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data, such as unseen text input.

Neural network parameters may be trained over multiple stages. For example, initial training (e.g., pre-training) may be performed on one set of training data, and then an additional training stage (e.g., fine-tuning) may be performed using a different set of training data. In some embodiments, all or a portion of parameters of one or more neural-network model being used together may be frozen, such that the "frozen" parameters are not updated during that training phase. This may allow, for example, a smaller subset of the parameters to be trained without the computing cost of updating all of the parameters.

The neural network illustrated in FIG. 5 is exemplary. For example, different neural network structures may be utilized, and additional neural-network based or non-neural-network based component may be used in conjunction as part of module 430. For example, a text input may first be embedded by an embedding model, a self-attention layer, etc. into a feature vector. The feature vector may be used as the input to input layer 541. Output from output layer 543 may be output directly to a user or may undergo further processing. For example, the output from output layer 543 may be decoded by a neural network based decoder. The neural network illustrated in FIG. 500 and described herein is representative and demonstrates a physical implementation for performing the methods described herein.

Through the training process, the neural network is "updated" into a trained neural network with updated parameters such as weights and biases. The trained neural network may be used in inference to perform the tasks described herein, for example those performed by module 430. The trained neural network thus improves neural network technology in text-to-speech synthesis.

Figure 6:
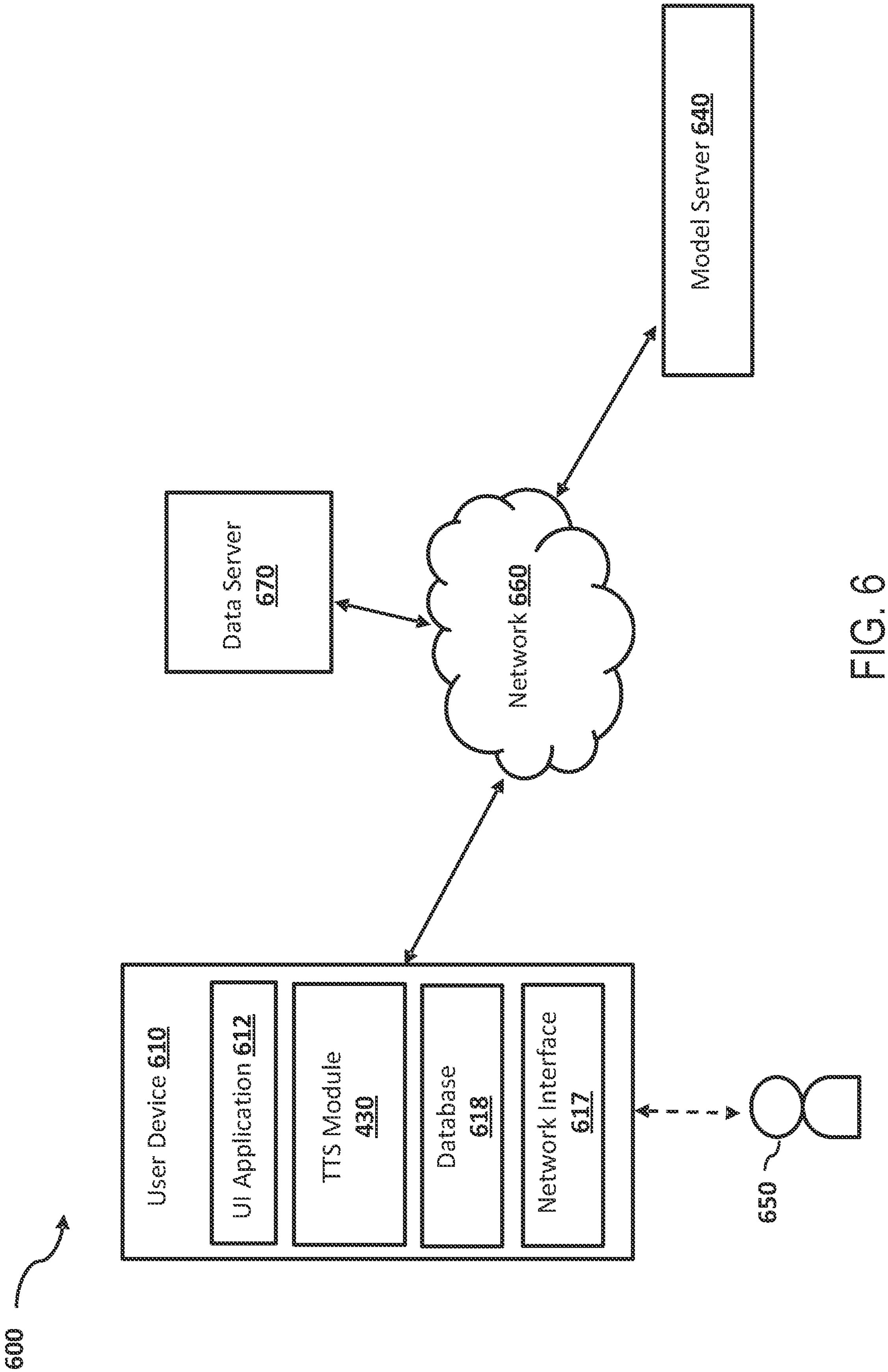
FIG. 6 is a simplified block diagram of a networked system suitable for implementing the framework described herein.

FIG. 6 is a simplified block diagram of a networked system 600 suitable for implementing the framework described herein. In one embodiment, system 600 includes the user device 610 (e.g., computing device 400) which may be operated by user 650, data server 670, model server 640, and other forms of devices, servers, and/or software components that operate to perform various methodologies in accordance with the described embodiments. Exemplary devices and servers may include device, stand-alone, and enterprise-class servers which may be similar to the computing device 400 described in FIG. 4, operating an OS such as a MICROSOFT® OS, a UNIX® OS, a LINUX® OS, a real-time operation system (RTOS), or other suitable device and/or server-based OS. It can be appreciated that the devices and/or servers illustrated in FIG. 6 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities. In some embodiments, user device 610 is used in training neural network based models. In some embodiments, user device 610 is used in performing inference tasks using pre-trained neural network based models (locally or on a model server such as model server 640).

User device 610, data server 670, and model server 640 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 600, and/or accessible over network 660. User device 610, data server 670, and/or model server 640 may be a computing device 400 (or similar) as described herein.

In some embodiments, all or a subset of the actions described herein may be performed solely by user device 610. In some embodiments, all or a subset of the actions described herein may be performed in a distributed fashion by various network devices, for example as described herein.

User device 610 may be implemented as a communication device that may utilize appropriate hardware and software configured for wired and/or wireless communication with data server 670 and/or the model server 640. For example, in one embodiment, user device 610 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLER. Although only one communication device is shown, a plurality of communication devices may function similarly.

User device 610 of FIG. 6 contains a user interface (UI) application 612, and TTS module 430, which may correspond to executable processes, procedures, and/or applications with associated hardware. For example, the user device 610 may allow a user to generate synthesized speech of a specified speaker and emotion. In other embodiments, user device 610 may include additional or different modules having specialized hardware and/or software as required.

In various embodiments, user device 610 includes other applications as may be desired in particular embodiments to provide features to user device 610. For example, other applications may include security applications for implementing client-side security features, programmatic client applications for interfacing with appropriate application programming interfaces (APIs) over network 660, or other types of applications. Other applications may also include communication applications, such as email, texting, voice, social networking, and IM applications that allow a user to send and receive emails, calls, texts, and other notifications through network 660.

Network 660 may be a network which is internal to an organization, such that information may be contained within secure boundaries. In some embodiments, network 660 may be a wide area network such as the internet. In some embodiments, network 660 may be comprised of direct physical connections between the devices. In some embodiments, network 660 may represent communication between different portions of a single device (e.g., a communication bus on a motherboard of a computation device).

Network 660 may be implemented as a single network or a combination of multiple networks. For example, in various embodiments, network 660 may include the Internet or one or more intranets, landline networks, wireless networks, and/or other appropriate types of networks. Thus, network 660 may correspond to small scale communication networks, such as a private or local area network, or a larger scale network, such as a wide area network or the Internet, accessible by the various components of system 600.

User device 610 may further include database 618 stored in a transitory and/or non-transitory memory of user device 610, which may store various applications and data (e.g., model parameters) and be utilized during execution of various modules of user device 610. Database 618 may store reference audio/Mel-spectrograms, model parameters, etc. In some embodiments, database 618 may be local to user device 610. However, in other embodiments, database 618 may be external to user device 610 and accessible by user device 610, including cloud storage systems and/or databases that are accessible over network 660 (e.g., on data server 670).

User device 610 may include at least one network interface component 617 adapted to communicate with data server 670 and/or model server 640. In various embodiments, network interface component 617 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data Server 670 may perform some of the functions described herein. For example, data server 670 may store a training dataset including training audio, text, emotion IDs, speaker IDs, etc. Data server 670 may provide data to user device 610 and/or model server 640. For example, training data may be stored on data server 670 and that training data may be retrieved by model server 640 while training a model stored on model server 640.

Model server 640 may be a server that hosts models described herein. Model server 640 may provide an interface via network 660 such that user device 610 may perform functions relating to the models as described herein (e.g., text-to-speech synthesis). Model server 640 may communicate outputs of the models to user device 610 via network 660. User device 610 may display model outputs, or information based on model outputs, via a user interface to user 650.

Figure 7:
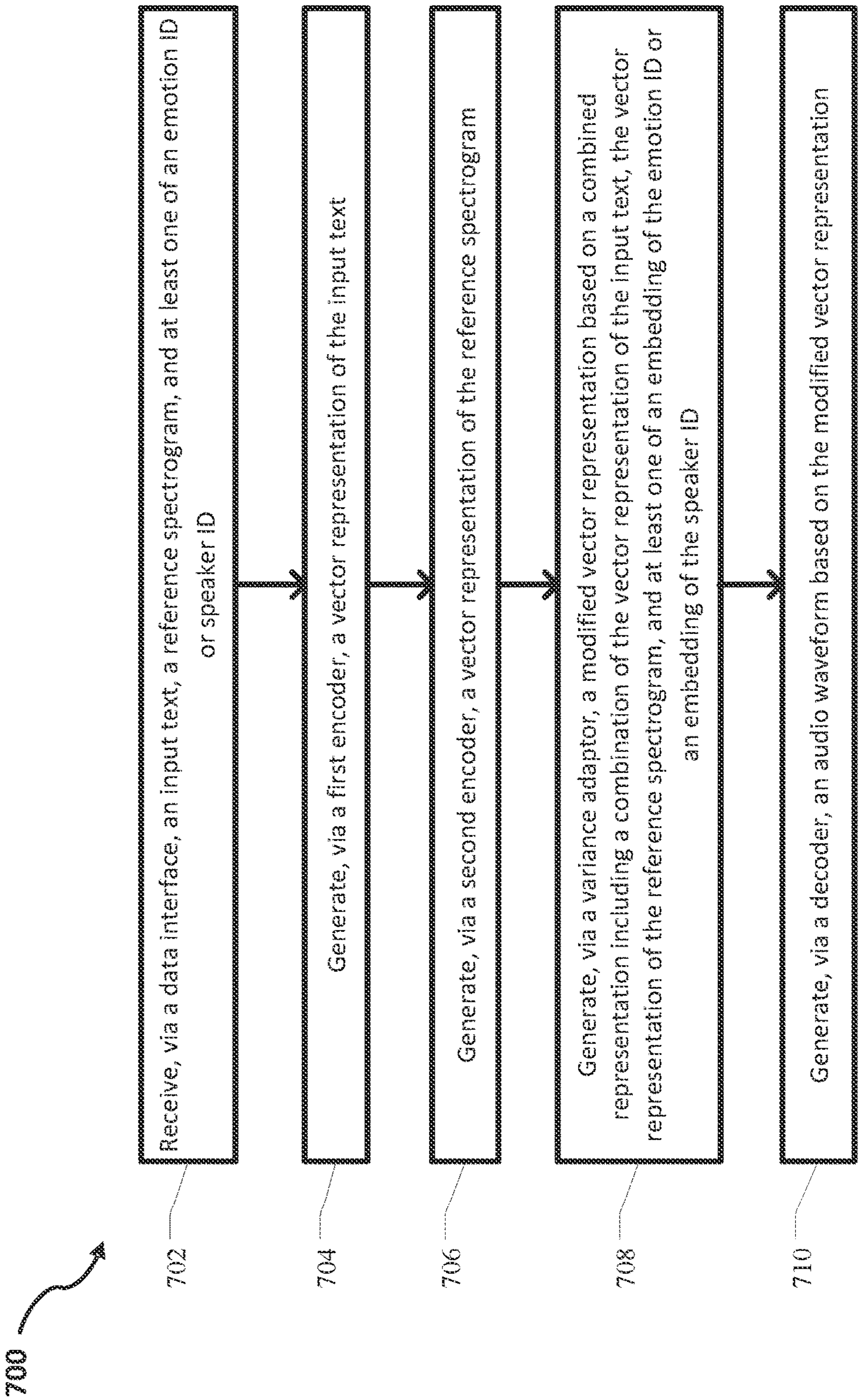
FIG. 7 is an example logic flow diagram, according to some embodiments.

FIG. 7 is an example logic flow diagram, according to some embodiments described herein. One or more of the processes of method 700 may be implemented, at least in part, in the form of executable code stored on non-transitory, tangible, machine-readable media that when run by one or more processors may cause the one or more processors to perform one or more of the processes (e.g., computing device 400). In some embodiments, method 700 corresponds to the operation of the TTS module 430 that performs text to speech synthesis.

As illustrated, the method 700 includes a number of enumerated steps, but aspects of the method 700 may include additional steps before, after, and in between the enumerated steps. In some aspects, one or more of the enumerated steps may be omitted or performed in a different order.

At step 702, a system (e.g., computing device 400, user device 610, model server 640, device 800, or device 815) receives, via a data interface (e.g., data interface 415, network interface 617, or an interface to a microphone and/or text input device) an input text (e.g., text 102), a reference spectrogram (e.g., Mel-spectrogram 104), and at least one of an emotion ID (e.g., emotion ID 106) or speaker ID (e.g., speaker ID 108).

At step 704, the system generates, via a first encoder (e.g., encoder 118), a vector representation of the input text. In some embodiments, the generating the vector representation of the input text includes generating a sequence of phoneme embeddings (e.g., phoneme embedding 110). In some embodiments, the first encoder includes at least one CNN layer and at least one self-attention layer.

At step 706, the system generates, via a second encoder (e.g., style encoder 112), a vector representation of the reference spectrogram.

At step 708, the system generates, via a variance adaptor (e.g., variance adaptor 120), a modified vector representation based on a combined representation including a combination of the vector representation of the input text, the vector representation of the reference spectrogram, and at least one of an embedding of the emotion ID or an embedding of the speaker ID. In some embodiments, the modified vector representation is a Mel-Spectrogram. In some embodiments, the modified vector representation may be duplicated by the variance adaptor according to a predicted duration of the related phoneme. For example, in some embodiments, generating the modified vector representation includes generating a duration prediction based on the combined representation, and duplicating the modified vector representation based on the predicted duration. In some embodiments, the variance adaptor generates at least one of a vector representation of a pitch prediction or a vector representation of an energy prediction based on the combined representation. The generating the modified vector representation may be based on a combination of the combined representation and at least one of the vector representation of the energy prediction or the vector representation of the pitch prediction.

At step 710, the system generates, via a decoder (e.g., decoder 122), an audio waveform based on the modified vector representation. In some embodiments, the decoder includes at least one CNN layer and at least one self-attention layer.

In some embodiments, method 700 may further include updating parameters (i.e., training) of at least one of the first encoder, the second encoder, the variance adaptor, or the decoder via backpropagation based on a comparison of the modified vector representation to a ground truth vector representation. In some embodiments, this is a mean square error comparison of Mel-spectrograms.

Figure 8B:
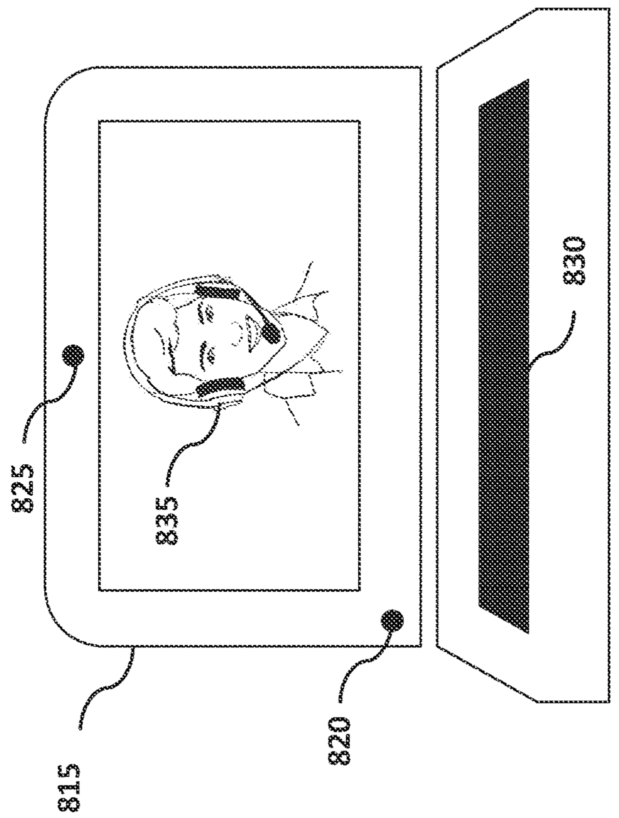
FIGS. 8A-8B are exemplary devices with digital avatar interfaces, according to some embodiments.
Figure 8A:
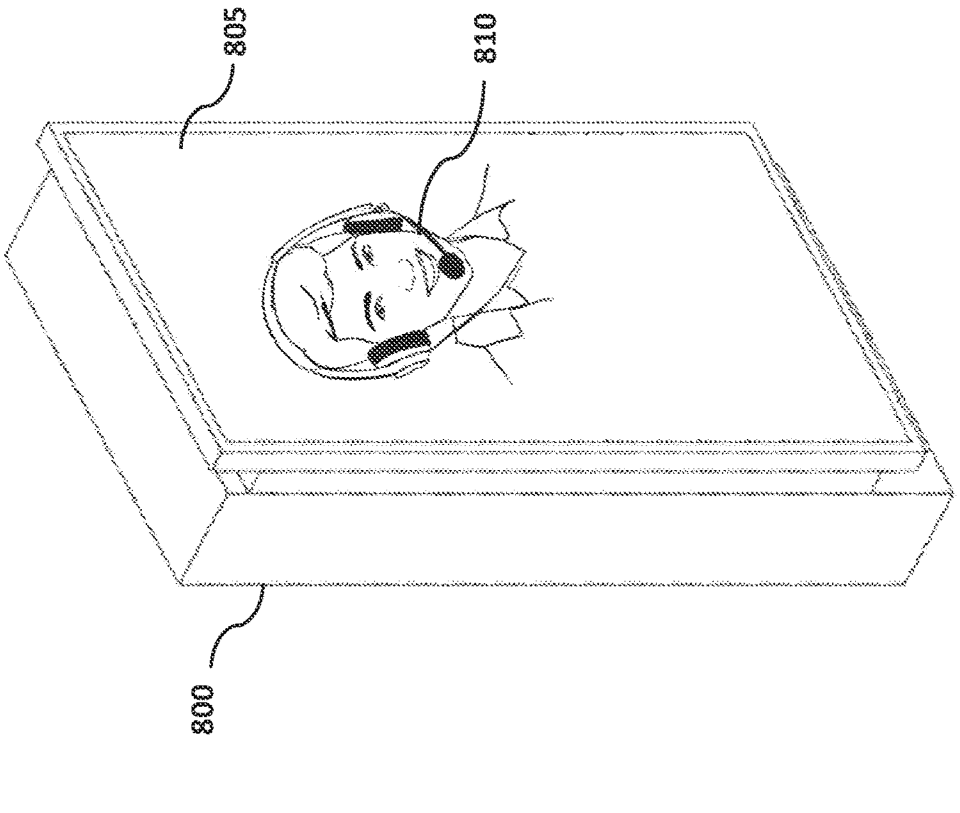

FIG. 8A is an exemplary device 800 with a digital avatar interface, according to some embodiments. Device 800 may be, for example, a kiosk that is available for use at a store, a library, a transit station, etc. Device 800 may display a digital avatar 810 on display 805. In some embodiments, a user may interact with the digital avatar 810 as they would a person, using voice and non-verbal gestures. Digital avatar 810 may interact with a user via digitally synthesized gestures, digitally synthesized voice, etc. For example, the synthesized voice of digital avatar 810 may be generated according to methods described herein with a specified voice and emotion. In some embodiments, a user may select the desired voice of digital avatar 810, and the speaker ID may be changed accordingly. In some embodiments, the emotion ID may be generated dynamically by device 800 based on one of the text that digital avatar 810 is speaking, or based on what the user is asking/saying or a predicted emotion of the user.

Device 800 may include one or more microphones, and one or more image-capture devices (not shown) for user interaction. Device 800 may be connected to a network (e.g., network 660). Digital Avatar 810 may be controlled via local software and/or through software that is at a central server accessed via a network. For example, an AI model may be used to control the behavior of digital avatar 810, and that AI model may be run remotely. In some embodiments, device 800 may be configured to perform functions described herein (e.g., via digital avatar 810). For example, device 800 may perform one or more of the functions as described with reference to computing device 400 or user device 610. For example, text to speech synthesis.

FIG. 8B is an exemplary device 815 with a digital avatar interface, according to some embodiments. Device 815 may be, for example, a personal laptop computer or other computing device. Device 815 may have an application that displays a digital avatar 835 with functionality similar to device 800. For example, device 815 may include a microphone 820 and image capturing device 825, which may be used to interact with digital avatar 835. In addition, device 815 may have other input devices such as a keyboard 830 for entering text.

Digital avatar 835 may interact with a user via digitally synthesized gestures, digitally synthesized voice, etc. Voice synthesis may be performed as described in FIGS. 1-7. In some embodiments, device 815 may be configured to perform functions described herein (e.g., via digital avatar 835). For example, device 815 may perform one or more of the functions as described with reference to computing device 400 or user device 610. For example, the synthesized voice of digital avatar 835 may be generated according to methods described herein with a specified voice and emotion. In some embodiments, a user may select the desired voice of digital avatar 835, and the speaker ID may be changed accordingly. In some embodiments, the emotion ID may be generated dynamically by device 815 based on one of the text that digital avatar 835 is speaking, or based on what the user is asking/saying or a predicted emotion of the user.

FIG. 9 is a chart illustrating exemplary performance of a text to speech model, according to some embodiments. The chart illustrates results compared to a baseline model, Fast Speech 2 as described in Ren et al., FastSpeech 2: Fast and High-Quality End-to-End Text to Speech, arXiv: 2006.04558. The experiment performed used an emotional dataset for learning and inference. Four raters tested 20 samples and indicated naturalness of the speech for five emotions on a scale of 1 to 5-1 (very bad), 2 (bad), 3 (average), 4 (good), 5. (very good) with the scores averaged among the respondents. As illustrated, the tested embodiment outperformed Fast Speech 2 for each emotion tested.

The devices described above may be implemented by one or more hardware components, software components, and/or a combination of the hardware components and the software components. For example, the device and the components described in the exemplary embodiments may be implemented, for example, using one or more general purpose computers or special purpose computers such as a processor, a controller, an arithmetic logic unit (ALU), a digital signal processor, a microcomputer, a field programmable gate array (FPGA), a programmable logic unit (PLU), a microprocessor, or any other device which executes or responds instructions. The processing device may perform an operating system (OS) and one or more software applications which are performed on the operating system. Further, the processing device may access, store, manipulate, process, and generate data in response to the execution of the software. For ease of understanding, it may be described that a single processing device is used, but those skilled in the art may understand that the processing device includes a plurality of processing elements and/or a plurality of types of the processing element. For example, the processing device may include a plurality of processors or include one processor and one controller. Further, another processing configuration such as a parallel processor may be implemented.

The software may include a computer program, a code, an instruction, or a combination of one or more of them, which configure the processing device to be operated as desired or independently or collectively command the processing device. The software and/or data may be interpreted by a processing device or embodied in any tangible machines, components, physical devices, computer storage media, or devices to provide an instruction or data to the processing device. The software may be distributed on a computer system connected through a network to be stored or executed in a distributed manner The software and data may be stored in one or more computer readable recording media.

The method according to the exemplary embodiment may be implemented as a program instruction which may be executed by various computers to be recorded in a computer readable medium. At this time, the medium may continuously store a computer executable program or temporarily store it to execute or download the program. Further, the medium may be various recording means or storage means to which a single or a plurality of hardware is coupled and the medium is not limited to a medium which is directly connected to any computer system, but may be distributed on the network. Examples of the medium may include magnetic media such as hard disk, floppy disks and magnetic tapes, optical media such as CD-ROMs and DVDs, magneto-optical media such as optical disks, and ROMs, RAMS, and flash memories to be specifically configured to store program instructions. Further, an example of another medium may include a recording medium or a storage medium which is managed by an app store which distributes application, a site and servers which supply or distribute various software, or the like.

Although the exemplary embodiments have been described above by a limited embodiment and the drawings, various modifications and changes can be made from the above description by those skilled in the art. For example, even when the above-described techniques are performed by different order from the described method and/or components such as systems, structures, devices, or circuits described above are coupled or combined in a different manner from the described method or replaced or substituted with other components or equivalents, the appropriate results can be achieved. It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. A method of text to speech synthesis, the method comprising:

receiving, via a data interface, an input text, a reference spectrogram, and an emotion identifier (emotion ID);

generating, via a first encoder, a vector representation of the input text;

generating, via a second encoder, a vector representation of the reference spectrogram;

generating, via a variance adaptor, a modified vector representation based on a combined representation including a sum of the vector representation of the input text, the vector representation of the reference spectrogram, and an embedding of the emotion ID, wherein the variance adaptor adapts the combined representation to adjust a pitch, an energy, and a duration; and generating, via a decoder, an audio waveform based on the modified vector representation.

2. The method of claim 1, wherein the generating the vector representation of the input text includes generating a sequence of phoneme embeddings.

3. The method of claim 1, wherein the modified vector representation is a Mel-spectrogram.

4. The method of claim 1, wherein the generating the modified vector representation includes:

generating a duration prediction based on the combined representation; and duplicating the modified vector representation based on the duration prediction.

5. The method of claim 4, further comprising:

generating at least one of a vector representation of a pitch prediction or a vector representation of an energy prediction based on the combined representation, wherein the generating the modified vector representation is based on a combination of the combined representation and at least one of the vector representation of the energy prediction or the vector representation of the pitch prediction.

6. The method of claim 1, wherein at least one of the first encoder or the decoder includes at least one convolutional neural network (CNN) layer and at least one self-attention layer.

7. The method of claim 1, further comprising:

updating parameters of at least one of the first encoder, the second encoder, the variance adaptor, or the decoder via backpropagation based on a comparison of the modified vector representation to a ground truth vector representation.

8. A system for text to speech synthesis, the system comprising:

a memory that stores a plurality of processor executable instructions;

a data interface that receives an input text, a reference spectrogram, and an emotion identifier (emotion ID); and one or more hardware processors that read and execute the plurality of processor-executable instructions from the memory to perform operations comprising:

generating, via a first encoder, a vector representation of the input text, generating, via a second encoder, a vector representation of the reference spectrogram, generating, via a variance adaptor, a modified vector representation based on a combined representation including a sum of the vector representation of the input text, the vector representation of the reference spectrogram, and an embedding of the emotion ID, wherein the variance adaptor adapts the combined representation to adjust a pitch, an energy, and a duration and generating, via a decoder, an audio waveform based on the modified vector representation.

9. The system of claim 8, wherein the generating the vector representation of the input text includes generating a sequence of phoneme embeddings.

10. The system of claim 8, wherein the modified vector representation is a Mel-spectrogram.

11. The system of claim 8, wherein the generating the modified vector representation includes:

generating a duration prediction based on the combined representation; and duplicating the modified vector representation based on the duration prediction.

12. The system of claim 11, the operations further comprising:

generating at least one of a vector representation of a pitch prediction or a vector representation of an energy prediction based on the combined representation, wherein the generating the modified vector representation is based on a combination of the combined representation and at least one of the vector representation of the energy prediction or the vector representation of the pitch prediction.

13. The system of claim 8, wherein at least one of the first encoder or the decoder includes at least one convolutional neural network (CNN) layer and at least one self-attention layer.

14. The system of claim 8, the operations further comprising:

updating parameters of at least one of the first encoder, the second encoder, the variance adaptor, or the decoder via backpropagation based on a comparison of the modified vector representation to a ground truth vector representation.

15. A non-transitory machine-readable medium comprising a plurality of machine executable instructions which, when executed by one or more processors, are adapted to cause the one or more processors to perform operations comprising:

receiving, via a data interface, an input text, a reference spectrogram, and an emotion identifier (emotion ID);

generating, via a first encoder, a vector representation of the input text;

generating, via a second encoder, a vector representation of the reference spectrogram;

generating, via a variance adaptor, a modified vector representation based on a combined representation including a sum of the vector representation of the input text, the vector representation of the reference spectrogram, and an embedding of the emotion ID, wherein the variance adaptor adapts the combined representation to adjust a pitch, an energy, and a duration; and generating, via a decoder, an audio waveform based on the modified vector representation.

16. The non-transitory machine-readable medium of claim 15, wherein the generating the vector representation of the input text includes generating a sequence of phoneme embeddings.

17. The non-transitory machine-readable medium of claim 15, wherein the modified vector representation is a Mel-spectrogram.

18. The non-transitory machine-readable medium of claim 15, wherein the generating the modified vector representation includes:

generating a duration prediction based on the combined representation; and duplicating the modified vector representation based on the duration prediction.

19. The non-transitory machine-readable medium of claim 18, the operations further comprising:

generating at least one of a vector representation of a pitch prediction or a vector representation of an energy prediction based on the combined representation, wherein the generating the modified vector representation is based on a combination of the combined representation and at least one of the vector representation of the energy prediction or the vector representation of the pitch prediction.

20. The non-transitory machine-readable medium of claim 15, the operations further comprising:

updating parameters of at least one of the first encoder, the second encoder, the variance adaptor, or the decoder via backpropagation based on a comparison of the modified vector representation to a ground truth vector representation.

* * * * *